(12) United States Patent
Pignard

(10) Patent No.: US 8,840,509 B2
(45) Date of Patent: Sep. 23, 2014

(54) FLUID SUPPLY SYSTEM AND METHOD OF OPERATING A FLUID SUPPLY SYSTEM

(75) Inventor: Frederic Pignard, Geisposlheim (FR)

(73) Assignee: GM Global Technology Operations LLC, Detroit, MI (US)

( * ) Notice: Subject to any disclaimer, the term of this patent is extended or adjusted under 35 U.S.C. 154(b) by 257 days.

(21) Appl. No.: 13/319,713

(22) PCT Filed: Mar. 27, 2010

(86) PCT No.: PCT/EP2010/001955
§ 371 (c)(1),
(2), (4) Date: Nov. 10, 2011

(87) PCT Pub. No.: WO2010/130319
PCT Pub. Date: Nov. 18, 2010

(65) Prior Publication Data
US 2012/0055559 A1    Mar. 8, 2012

(30) Foreign Application Priority Data

May 12, 2009 (GB) .................................. 0908114.2

(51) Int. Cl.
*F16H 57/04* (2010.01)
(52) U.S. Cl.
USPC ........ 475/159; 475/161; 74/467; 137/599.11; 184/6.12
(58) Field of Classification Search
USPC .................... 475/159–161; 74/467; 184/6.12; 137/599.11
See application file for complete search history.

(56) References Cited

U.S. PATENT DOCUMENTS 5,749,439 A * 5/1998 Van Maanen ................ 184/6.12
(Continued)

FOREIGN PATENT DOCUMENTS

| EP | 0159772 A1 | 10/1985 |
| JP | 2000046156 A | 2/2000 |
| WO | 2008072775 A2 | 6/2008 |

OTHER PUBLICATIONS

International Searching Authority, International Search Report for Application No. PCT/EP2010/001955, dated Jun. 23, 2010.

*Primary Examiner* — Roger Pang
(74) *Attorney, Agent, or Firm* — Ingrassia Fisher & Lorenz, P.C.

(57) ABSTRACT

A fluid supply system is provided for cooling and lubricating a transmission of an automobile, which includes, but is not limited to a cooling channel for cooling the transmission and a lubrication channel for lubricating the transmission. The lubrication channel communicates with the cooling channel via a shift valve. The shift valve is adapted to provide at least a first valve status, by which the cooling channel is connected to the lubrication channel via only one first valve path, and a second valve status, by which the cooling channel is connected to the lubrication channel via at least the first valve path and by which the cooling channel is connected in addition via a second valve path to a bypass channel bypassing the lubrication channel. Since at least two different valve statuses optimized for low and high power are provided, it is possible to reduce unnecessary spin losses over the whole range of applied powers. Further, there is no need for unfavorable compromises, so that a reduced flow generation loss over the whole range of applied powers is provided, while sufficient cooling and lubricating is safeguarded at the same time.

12 Claims, 1 Drawing Sheet

(56) References Cited

U.S. PATENT DOCUMENTS

| | | | |
|---|---|---|---|
| 6,427,640 B1* | 8/2002 | Hickey et al. | 123/41.31 |
| 7,210,522 B2* | 5/2007 | Gruian | 165/202 |
| 2004/0204281 A1* | 10/2004 | Wakayama | 475/161 |
| 2007/0000728 A1 | 1/2007 | Pignard et al. | |
| 2008/0234903 A1 | 9/2008 | Satou | |
| 2010/0062890 A1 | 3/2010 | Shimizu | |

* cited by examiner

FLUID SUPPLY SYSTEM AND METHOD OF OPERATING A FLUID SUPPLY SYSTEM

CROSS-REFERENCE TO RELATED APPLICATIONS

This application is a U.S. National-Stage entry under 35 U.S.C. §371 based on International Application No. PCT/EP2010/001955, filed Mar. 27, 2010, which was published under PCT Article 21(2) and which claims priority to British Application No. 0908114.2, filed May 12, 2009, which are all hereby incorporated in their entirety by reference.

TECHNICAL FIELD

The technical field relates to a fluid supply system for cooling and lubricating a transmission, particularly automatic transmission, of an automobile as well as a method of operating such kind of a fluid supply system.

BACKGROUND

From US 2007/0000728 A1 a fluid supply system for cooling and lubricating an automatic transmission is known, wherein a cooling channel for cooling the automatic transmission is branched into a lubrication channel for lubricating the automatic transmission and a bypass channel bypassing the lubrication channel towards an oil sump. By means of this fluid supply system spin losses of the transmission can be reduced. But this fluid system still comprises a high flow generation loss, so that a comparatively high amount of energy is necessary for providing a particular cooling mass flow. There is a permanent need reducing the flow generation loss of fluid supply systems further.

It is at least one object to provide a fluid supply system, by means of which the flow generation loss during operation can be reduced, while sufficient cooling and lubricating is safeguarded. In addition, other objects, desirable features and characteristics will become apparent from the subsequent summary and detailed description, and the appended claims, taken in conjunction with the accompanying drawings and this background.

SUMMARY

A fluid supply system according to the invention for cooling and lubricating a transmission of an automobile comprises a cooling channel for cooling the transmission and a lubrication channel for lubricating the transmission. According to the invention the lubrication channel communicates with the cooling channel via a shift valve, wherein the shift valve is adapted to provide at least a first valve status, by which the cooling channel is connected to the lubrication channel via only one first valve path, and a second valve status, by which the cooling channel is connected to the lubrication channel via at least the first valve path and by which the cooling channel is connected in addition via a second valve path to a bypass channel bypassing the lubrication channel.

At low power, when only a low torque and speed is transmitted by the transmission, only a low cooling and a low lubricating is required for the transmission, which is particularly an automatic transmission. At these circumstances it is sufficient, that the mass flow $\dot{m}_C$ of the cooling channel is limited to the minimum lubrication mass flow $\dot{m}_{L,min}$ required for the lubrication of the transmission. This is realized by switching the shift valve to the first valve status, by which the cooling channel is connected to the lubrication channel without a further branch. Only one first valve path inside the shift valve is provided for connecting the cooling channel to the lubrication channel. This safeguards that in the first valve status the mass flow $\dot{m}_C$ of the cooling channel corresponds to the lubrication mass flow $\dot{m}_L$ of the lubrication channel. A mass flow $\dot{m}_C$ of the cooling channel higher than necessary is prevented, so that unnecessary viscous friction and unnecessary turbulence zones inside the cooling channel are prevented reducing the pressure drop inside the cooling channel and leading to a reduced flow generation loss. Due to the reduced flow generation loss less energy is necessary for providing a particular cooling mass flow.

At the same time it is possible to provide optimized mass flows at higher powers, when a high torque and speed is transmitted by the transmission. It is used the insight that at higher power the required cooling mass flow $\dot{m}_C$ increases stronger than the required lubrication mass flow $\dot{m}_L$. For preventing an unnecessary high lubrication mass flow $\dot{m}_L$, which would lead to unnecessary spin losses of the transmission and an increased flow resistance, the shift valve can be switched to the second valve status, by which a part of the cooling mass flow $\dot{m}_C$ is branched via the second valve path inside the shift valve to the bypass channel, where the bypassed mass flow can be led directly to an oil sump or the like. The shift valve is actuated for instance by means of a suitable control unit, which may monitor the torque and/or speed transferred by the transmission, the applied power, the temperature inside the transmission or the like. Since at least two different valve statuses optimized for low and high power are provided, it is possible to reduce unnecessary spin losses over the whole range of applied powers. Further, there is no need for unfavorable compromises, so that a reduced flow generation loss over the whole range of applied powers is provided, while sufficient cooling and lubricating is safeguarded at the same time.

In an embodiment in the second valve status the cooling channel is connected to the lubrication channel in addition to the first valve path via at least one additional valve path. Due to the additional valve path the effective flow section for the lubrication mass flow $\dot{m}_L$ can be increased reducing viscous friction and turbulence zones reducing the pressure drop and the flow resistance. Particularly the smallest flow section effective for the lubrication channel can be increased reducing the flow generation loss particularly at high power, when the flow speed and the pressure inside the cooling channel is increased in comparison to the flow conditions at low power. The smallest flow section communicating with the first valve path can be optimized with respect to the flow conditions, when the shift valve is switched to the first valve status. An optimized effective flow section, when the shift valve is switched to the second valve status, can be provided by an optimized design of the flow path communicating with the additional valve path.

Particularly, the additional valve path communicates with a restrictor orifice. The flow section of the restrictor orifice is chosen such that the lubrication flow $\dot{m}_L$, which comprises the sum of a mass flow $\dot{m}_{L1}$ of the first valve path and a mass flow $\dot{m}_{L2}$ of the additional valve path, at maximal transferred power $P_{max}$ is at least a minimum lubrication flow $\dot{m}_{L,min}$ ($P_{max}$) at maximum transferred power $P_{max}$ of the transmission. Due to the design of the restrictor orifice it can be safeguarded that at every applied power, when the second valve status is active, the minimum lubrication flow $\dot{m}_{L,min}$ (P), which depends on the transferred power P, is met. Particularly a safety interval is $\Delta \dot{m}_L \dot{m}_{L,actual} - \dot{m}_{L,min}$ (P) is provided, so that the actual mass flow $\dot{m}_{L,actual}$ is always above the necessary minimum lubrication flow $\dot{m}_{L,min}$ (P). The safety interval $\Delta\dot{m}_L$ is particularly chosen such, that $1.00 \leq \dot{m}_{L,actual}/\dot{m}_{L,min}$ (P) $\leq 1.50$, preferably $1.05 \leq \dot{m}_{L,actual}/\dot{m}_{L,min}$ (P) $\leq 1.20$ and more preferred $1.08 \leq \dot{m}_{L,actual}/\dot{m}_{L,min}$ (P) $\leq 1.10$ is given.

Preferably, the first valve path communicates with a main lubrication orifice. The flow section of the main lubrication orifice is chosen such that at minimum transferred power) $P_{min}$ the lubrication flow $\dot{m}_L$ is at least a minimum lubrication flow $\dot{m}_{L,min}$ ($P_{min}$) of the transmission. The main lubrication orifice can be optimized for low power applications such, that at every applied power, when the first valve status is active, the minimum lubrication flow $\dot{m}_{L,min}$ which depends on the transferred power P, is met. Particularly a safety interval $\Delta\dot{m}_L = \dot{m}_{L,actual} - \dot{m}_{L,min}$ (P) is provided, so that the actual mass flow $\dot{m}_{L,actual}$ is always above the necessary minimum lubrication flow $\dot{m}_{L,min}$ (P). The safety interval $\Delta\dot{m}_L$ is particularly chosen such, that $1.00 \leq \dot{m}_{L,actual}/\dot{m}_{L,min}$ (P) $\leq 1.50$, preferably $1.05 \leq \dot{m}_{L,actual}/\dot{m}_{L,min}$ (P) $\leq 1.20$ and more preferred $1.08 \leq \dot{m}_{L,actual}/\dot{m}_{L,min}$ (P) $\leq 1.10$ is given.

Particularly the second valve path communicates with a bypass orifice. The flow section of the bypass orifice is chosen such that the lubrication flow $\dot{m}_L$ at maximal) transferred power $P_{max}$ is at least a minimum lubrication flow $\dot{m}_{L,min}$ ($P_{max}$ at maximum transferred power $P_{max}$ of the transmission. The bypass orifice can be optimized for high power applications such, that at every applied power, when the second valve status is active, the minimum lubrication flow $\dot{m}_{L,min}$ (P) which depends on the transferred power P, is met. Particularly a safety interval $\Delta\dot{m}_L = \dot{m}_{L,actual} - \dot{m}_{L,min}$ (P) is provided, so that the actual mass flow $\dot{m}_{L,actual}$ is always above the necessary minimum lubrication flow $\dot{m}_{L,min}$ ($P_{max}$). The safety interval $\Delta\dot{m}_L$ is particularly chosen such, that $1.00 \leq \dot{m}_{L,actual}/\dot{m}_{L,min}$ ($P_{max}$) $\leq 1.50$, preferably $1.05 \leq \dot{m}_{L,actual}/\dot{m}_{L,min}$ ($P_{max}$) $\leq 1.20$ and more preferred $1.08 \leq \dot{m}_{L,actual}/\dot{m}_{L,min}$ ($P_{max}$) $\leq 1.10$ is given. Due to the design of the bypass orifice a lubrication mass flow $\dot{m}_{L,actual}$ higher than necessary at the maximum transferred power can be prevented, when the safety interval is considered. The spin losses of the transmission and the flow resistance of the lubrication channel can be minimized particularly at higher powers.

In an embodiment the shift valve is adapted to switch from the first valve status to the second valve status, when a mass flow $\dot{m}_C$ of the cooling channel exceeds a predetermined mass flow threshold. The predetermined mass flow threshold is particularly chosen such, that the second valve status is applied when the first valve status provides a lubrication flow $\dot{m}_L$ exceeding a required minimum lubrication flow $\dot{m}_{L,min}$ (P) by a predefined tolerance value $\Delta\dot{m}_{switch}$. The predetermined mass flow threshold can be chosen such that the first valve status is active as long as possible without leading to a too high flow generation loss and/or a too high pressure drop in the lubrication channel. The tolerance value $\Delta\dot{m}_{switch} = \dot{m}_{L,actual} - \dot{m}_{L,min}$ (P) is particularly chosen such, that $1.05 \leq \dot{m}_{L,actual}/\dot{m}_{L,min}$ (P) $\leq 1.70$, preferably $1.08 \leq \dot{m}_{L,actual}/\dot{m}_{L,min}$ (P) $\leq 1.50$ and more preferred $1.10 \leq \dot{m}_{L,actual}/\dot{m}_{L,min}$ (P) $\leq 1.20$ is given.

Particularly the lubrication channel and the bypass channel are connected to an oil sump. The cooling channel is fed from the oil sump. This leads to a mainly closed fluid circuit. Particularly the oil sump can be arranged spaced to the transmission, so that the used lube fluid, particularly transmission oil, can be cooled in the oil sump.

Preferably the shift valve is adapted to be actuated by means of a solenoid. Particularly the solenoid is adapted for acting in and/or against a provided spring force. The solenoid can be actuated electrically particularly by means of a control unit communicating with a CAM-bus of an automobile. The shift valve can be shifted between the at least two or more valve statuses based on information provided by a motor steering unit or the like. Due to the spring force for instance provided by means of a coil spring the shift valve can be shifted to a definite valve status, preferably the second valve status, when no electrical power is applied for actuating the solenoid.

In an embodiment the shift valve comprises more outlet ports than inlet ports. A branching of the cooling mass flow $\dot{m}_C$ to more than one mass flows can be provided completely or only partially inside the shift valve.

Particularly the cooling channel is arranged upstream to the lubrication channel and the bypass channel. Since at high powers the required cooling mass flow $\dot{m}_C$ is higher than the required lubrication mass flow $\dot{m}_L$, it is easier to branch a bypass mass flow not needed for the lubrication of the transmission from the cooling mass flow $\dot{m}_L$. Only one pump arranged in the cooling channel is sufficient for feeding all connected channels.

An automatic transmission is also provided for an automobile, comprising an automatic gear assembly arranged inside of a gear case, whereby a fluid supply system, which may be designed as previously described, is provided for cooling and lubricating the gear assembly. Since at least two different valve statuses optimized for low and high power are provided, it is possible to reduce unnecessary spin losses over the whole range of applied powers. Further, there is no need for unfavorable compromises, so that a reduced flow generation loss over the whole range of applied powers is provided, while sufficient cooling and lubricating is safeguarded at the same time. This in turn leads to a reduction of $CO_2$-emissions of the automobile comprising such kind of an automatic transmission.

Particularly the cooling channel is connected to a radiator. The radiator is arranged outside the gear case. Since the radiator is arranged spaced to the transmission, mainly no heat of the transmission can affect the cooling effect of the radiator.

A method of operating is provided for a fluid supply system, which may be designed as previously described, whereby at start the shift valve is in the first valve status and the shift valve is switched into the second valve status, when a mass flow $\dot{m}_C$ of the cooling channel exceeds a predetermined mass flow threshold. The predetermined mass flow threshold is particularly chosen such, that the second valve status is applied, when the first valve status provides a lubrication flow $\dot{m}_L$ exceeding a required minimum lubrication flow $\dot{m}_{L,min}$ (P) by a predefined tolerance value $\Delta\dot{m}_{switch}$. The predetermined mass flow threshold can be chosen such that the first valve status is active as long as possible without leading to a too high flow resistance and/or a too high pressure drop in the lubrication channel. The flow generation loss is reduced, while sufficient cooling and lubricating is safeguarded. The tolerance value $\Delta\dot{m}_{switch} = \dot{m}_{L,actual} - \dot{m}_{L,min}$ (P) is particularly chosen such, that $1.05 \leq \dot{m}_{L,actual}/\dot{m}_{L,min}$ (P) $\leq 1.70$, preferably $1.08 \leq \dot{m}_{L,actual}/\dot{m}_{L,min}$ (P) $\leq 1.50$ and more preferred $1.10 \leq \dot{m}_{L,actual}/\dot{m}_{L,min}$ (P) $\leq 1.20$ is given. The method of operating the fluid system can be further designed as previously described with reference to the fluid supply system.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to application and uses. Furthermore, there is no intention to be bound by any theory presented in the preceding background or summary or the following detailed description.

Figure 1:
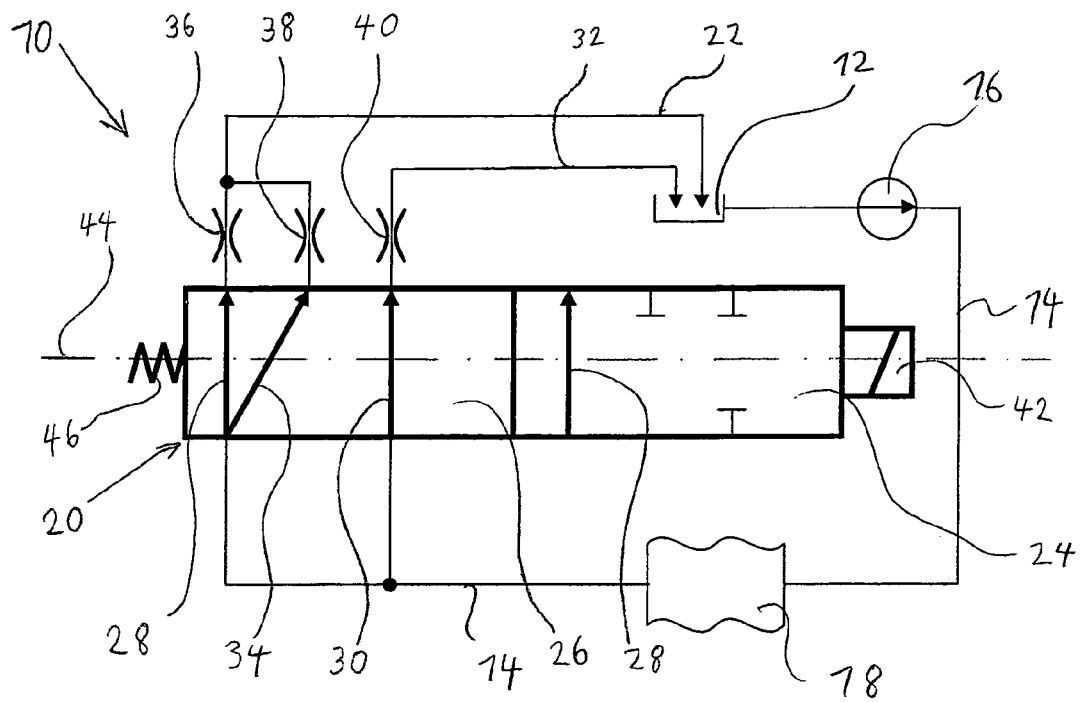
FIG. 1 is a schematic principal view of a fluid supply system according to an embodiment.

The fluid supply system 10 illustrated in FIG. 1 comprises an oil sump 12 from which a cooling channel 14 is fed by means of an oil pump 16 with transmission oil of a mass flow $\dot{m}_C$. The cooling channel 14 comprises a radiator 18 for cooling the transmission oil particularly after the transmission oil cooled a not illustrated automatic transmission. The cooling channel 14 is connected via a shift valve 20 to a lubrication channel 22 of a mass flow $\dot{m}_L$, which ends at the oil sump 12.

The shift valve comprises a first chamber 24, which is arranged in FIG. 1 at the right side of the shift valve 20, as well as a second chamber, which is arranged in FIG. 1 at the left side of the shift valve 20. By means of the first chamber 24 a first valve status can be set, by which the cooling channel 14 is connected to the lubrication channel 22 via one first valve path 28 without any branch. In the first valve status the cooling mass flow $\dot{m}_C$ corresponds to the lubrication mass flow $\dot{m}_L$.

When the shift valve 20 is set to the second valve status as illustrated in FIG. 1, a part of the cooling mass flow $\dot{m}_C$ is branched via a second valve path 30 to a bypass channel 32 bypassing the lubrication channel 22 to the oil sump 12 without using the branched transmission oil for lubricating the transmission. The part of the cooling mass flow $\dot{m}_C$ led to the lubrication channel 22 is further split by means of at least one additional valve path 34, wherein all split flows are led together to the lubrication channel 22. In the first valve status the lubrication mass flow $\dot{m}_L$ have to pass a main lubrication orifice 36, which comprises usually a constant effective flow section and may increase the flow generation loss at higher mass flows. Due to the additional valve path 34 the lubrication mass flow $\dot{m}_L$ can pass not only the main lubrication orifice 36 but also a restrictor orifice 38 communicating with the additional valve path 34 leading to a reduced flow resistance. The mass flow of the bypass channel 32 can be adjusted by means of the effective flow section of a bypass orifice 40.

The shift valve 20 can switch between the at least two valve statuses by actuating a solenoid 42 acting along a spring force direction 44 provided by a coil spring 46. The solenoid 42 can be actuated by means of a not illustrated control unit, which monitors the flow conditions of the transmission oil and/or the required mass flows.

Figure 2:
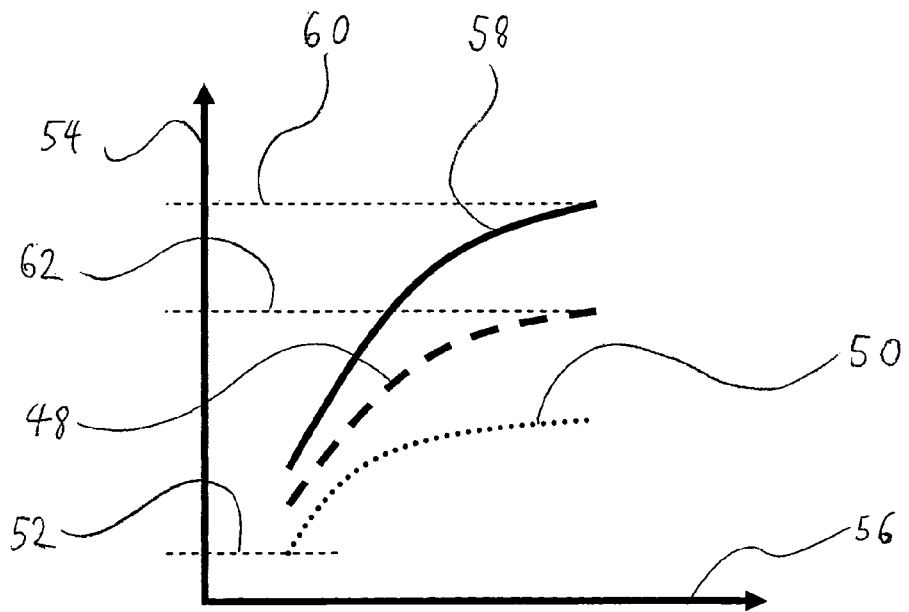
FIG. 2 is a schematic diagram of mass flows in dependence to a transferred power.

In FIG. 2 mass flows 54 are illustrated in dependence to a power 56 transferred by the transmission, when the shift valve 20 is set to the second valve status. At high power the transmission is in need of increased cooling, so that the cooling mass flow 58 increases until a maximum required cooling mass flow 60 is reached. Since a maximum required lubrication mass flow 62 is much lower than the maximum required cooling mass flow 60, the lubrication mass flow 48 is reduced by branching from the cooling mass flow 58 a bypass mass flow 50 to the oil sump 12 without using the bypass mass flow 50 for lubricating the transmission. At low power the shift valve 20 can be switched to the first valve status, so that the cooling mass flow 58 and the lubrication mass flow 48 can be adjusted close to a minimum lubrication mass flow 52.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

The invention claimed is:

1. A fluid supply system for cooling and lubricating a transmission of an automobile, comprising:
    a cooling channel configured to cool the transmission; and
    a lubrication channel configured to lubricate the transmission, the lubrication channel is further configured to communicate with the cooling channel via a shift valve, wherein the shift valve is configured to:
    provide a first valve status by which the cooling channel is connected to the lubrication channel via a first valve path, and
    provide a second valve status, by which the cooling channel is connected to the lubrication channel via at least the first valve path and by which the cooling channel is connected in addition via a second valve path to a bypass channel bypassing the lubrication channel, and by which an additional valve path is configured to connect the cooling channel to the lubrication channel in addition to the first valve path in the second valve status.

2. The fluid supply system according to claim 1,
    wherein the additional valve path is configured to communicate with a restrictor orifice,
    wherein a flow section of the restrictor orifice is selected such that a lubrication flow $\dot{m}_L$, which comprises a sum of a mass flow $\dot{m}_{L1}$ of the first valve path and a second mass flow $\dot{m}_{L2}$ of the additional valve path, at maximal transferred power $P_{max}$ is at least a minimum lubrication flow $\dot{m}_{L,\,min}(P_{max})$ at maximum transferred power $P_{max}$ of the transmission.

3. The fluid supply system according to claim 1,
    wherein the first valve path is configured to communicate with a main lubrication orifice, and
    wherein a flow section of the main lubrication orifice is chosen such that at minimum transferred power $P_{min}$ a lubrication flow $\dot{m}_L$ is at least a minimum lubrication flow $\dot{m}_{L,\,min}(P_{min})$ of the transmission.

4. The fluid supply system according to claim 1,
    wherein the second valve path is configured to communicate with a bypass orifice, and
    wherein a flow section of the bypass orifice is chosen such that a lubrication flow $\dot{m}_L$ at maximal transferred power $P_{max}$ is at least a minimum lubrication flow $\dot{m}_{L,\,min}(P_{max})$ at maximum transferred power $P_{max}$ of the transmission.

5. The fluid supply system according to claim 1, wherein the shift valve is configured to switch from the first valve status to the second valve status, when a mass flow $\dot{m}_C$ of the cooling channel exceeds a predetermined mass flow threshold, wherein the predetermined mass flow threshold is particularly chosen such, that the second valve status is applied when the first valve status provides a lubrication flow $\dot{m}_L$ exceeding a required minimum lubrication flow $\dot{m}_{L,\,min}(P)$ by a predefined tolerance value $\Delta \dot{m}_{switch}$.

6. The fluid supply system according to claim 1,
wherein the lubrication channel and the bypass channel are connected to an oil sump, and
wherein the cooling channel is fed from the oil sump.

7. The fluid supply system according to claim 1, wherein the shift valve is configured for actuation by a solenoid interacting with a provided spring force.

8. The fluid supply system according to claim 1, wherein the shift valve comprises a greater number of outlet ports as compared to inlet ports.

9. The fluid supply system according to claim 1, wherein the cooling channel is upstream to the lubrication channel and the bypass channel.

10. An automatic transmission for an automobile, comprising:
    a gear case;
    an automatic gear assembly inside of the gear case;
    a fluid supply system configured to cool and lubricate the automatic gear assembly, the fluid supply system, comprising:
        a cooling channel configured to cool the automatic transmission; and
        a lubrication channel configured to lubricate the automatic transmission,
    the lubrication channel is further configured to communicate with the cooling channel via a shift valve,
    wherein the shift valve is configured to:
        provide a first valve status by which the cooling channel is connected to the lubrication channel via a first valve path, and
        provide a second valve status, by which the cooling channel is connected to the lubrication channel via the first valve path and by which the cooling channel is connected in addition via a second valve path to a bypass channel bypassing the lubrication channel, and by which an additional valve path is configured to connect the cooling channel to the lubrication channel in addition to the first valve path in the second valve status.

11. The automatic transmission according to claim 10,
wherein the cooling channel is connected to a radiator, and
wherein the radiator is outside the gear case.

12. A method of operating a fluid supply system, comprising:
    providing a cooling channel configured to cool the transmission;
    providing a lubrication channel configured to lubricate the transmission and to communicate with the cooling channel via a shift valve,
    placing the shift valve into a first valve status by which the cooling channel is connected to the lubrication channel via a first valve path;
    switching the shift valve into a second valve status when a mass flow $\dot{m}_C$ of the cooling channel exceeds a predetermined mass flow threshold, by which the cooling channel is connected to the lubrication channel via the first valve path and by which the cooling channel is connected in addition via a second valve path to a bypass channel bypassing the lubrication channel, and by which an additional valve path is configured to connect the cooling channel to the lubrication channel in addition to the first valve path in the second valve status,
    wherein the predetermined mass flow threshold is particularly chosen such, that the second valve status is applied when the first valve status provides a lubrication flow $\dot{m}_L$ exceeding a required minimum lubrication flow $\dot{m}_{L,\ min}$ (P) by a predefined tolerance value $\Delta \dot{m}_{switch}$.

* * * * *